US005223200A

United States Patent [19]

Schulz et al.

[11] Patent Number: 5,223,200

[45] Date of Patent: Jun. 29, 1993

[54] METHOD FOR PRODUCING CONCRETE ROOF TILES

[75] Inventors: Hans E. Schulz, Bad Soden/Ts; Jurgen Braas, Friedrichsdorf/Ts., both of Fed. Rep. of Germany

[73] Assignee: Braas GmbH, Frankfurter, Fed. Rep. of Germany

[21] Appl. No.: 641,700

[22] Filed: Jan. 16, 1991

Related U.S. Application Data

[63] Continuation-in-part of Ser. No. 329,660, Mar. 29, 1989, Pat. No. 5,004,415, which is a continuation of Ser. No. 870,932, Jun. 5, 1986, abandoned.

[30] Foreign Application Priority Data

Jun. 26, 1985 [DE] Fed. Rep. of Germany ....... 3522846

[51] Int. Cl.$^5$ ........................ B28B 5/00; B28B 11/08; B28B 11/14; B29C 47/00

[52] U.S. Cl. .................................... 264/145; 264/148; 264/151; 264/157; 264/160; 264/163; 264/296; 264/297.7; 264/297.9; 264/333

[58] Field of Search ............... 264/148, 163, 296, 333, 264/151, 157, 162, 145, 160, 297.7, 297.9; 425/311, 289, 296–298, 305.1, 235, 106, 238, 315, 512, 521; 83/110

[56] References Cited

U.S. PATENT DOCUMENTS

| | | | |
|---|---|---|---|
| 1,973,092 | 9/1934 | Mooney | 264/148 |
| 2,258,553 | 10/1941 | Hartley | 264/148 |
| 2,644,217 | 7/1953 | Agar | 264/163 X |
| 3,183,287 | 5/1965 | Fischer | 425/311 X |
| 3,461,196 | 8/1969 | Bowles | 264/148 |
| 3,776,075 | 12/1973 | Matthews | 264/145 X |
| 4,695,418 | 9/1987 | Baker et al. . | |
| 4,856,395 | 8/1989 | Smith et al. | 264/163 X |
| 5,004,415 | 4/1991 | Schulz et al. | 264/163 X |
| 5,017,320 | 5/1991 | Velazquez Garcia | 264/148 |

FOREIGN PATENT DOCUMENTS 2164288 3/1986 United Kingdom .

*Primary Examiner*—Karen Aftergut

*Attorney, Agent, or Firm*—Eugene E. Renz, Jr.

[57] ABSTRACT

A method for making concrete roof tiles includes the steps of forming a continuous elongated ribbon or layer of concrete; cutting the continuous layer into a row of spaced end to end ribbon sections having a front edge and a rear edge; precompacting the front edge of one of two adjacent ribbon sections and compacting the precompacted front edge of the other ribbon section.

6 Claims, 8 Drawing Sheets

METHOD FOR PRODUCING CONCRETE ROOF TILES

This application is a continuation-in-part application of our prior co-pending application, Ser. No. 07/329,660, filed Mar. 29, 1989, entitled APPARATUS FOR PRODUCING CONCRETE ROOF TILES, issued as U.S. Pat. No. 5,004,415 on Apr. 2, 1991, which in turn is a continuation of Ser. No. 06/870,932, filed Jun. 5, 1986 entitled PROCESS AND APPARATUS FOR PRODUCING CONCRETE ROOF TILES, now abandoned.

BACKGROUND OF THE INVENTION

1. Field of the Invention

The invention relates to a method for producing concrete roof tiles in an extrusion process and the roof tiles produced thereby. The invention also relates to an apparatus for carrying out this process. Finally, the invention relates to the concrete roof tiles obtained by the new process. The new process is in the same manner suitable for producing both plain concrete roof tiles and profiled concrete roof tiles. The invention is described below, particularly with reference to the production of profiled concrete roof tiles, although there is no intention to restrict the invention because of this.

2. Prior Art

U.S. Pat. No. 3,776,075 issued to Douglas Frederick Matthews on Dec. 4, 1973 for MANUFACTURE OF TILES discloses a process and apparatus of this general type. The content of Matthews U.S. Pat. No. 3,776,075 is incorporated herein by reference, where necessary. This known apparatus for cutting a continuously moving ribbon of plastically deformable material into individual concrete tiles allows throughput rates of 150 tiles per minute to be achieved. However, the high cutting speed required results in irregularities on the cut surfaces.

The trimming tool of the known apparatus is a trimming knife which trims the leading edge of the next molding of the moldings just cut off from the layer of fresh concrete. In this trimming operation, a short length is removed from the front edge of each molding, so that the finished moldings adjacent to one another do not stick together during subsequent curing. The strip of material cut off during trimming is removed. It is customary, at the same time, to arrange for the trimming knife to be inclined rearwardly relative to the moldings, so that the front edges of the concrete tiles have a more pleasing appearance when laid on a roof.

The prior process and apparatus presents certain disadvantages and drawbacks. For example, the concrete roof tiles obtainable by means of this known proposal have both on the rear edge and on the front edge a plane cut surface which typically possesses pores and other irregularities. The roughness and porosity of these cut surfaces are substantially greater than those of the compacted top side, with the result that the end faces of concrete roof tiles do not have the outstanding quality of the compacted top side. The quality of the rear end face of a roof tile is less important, because, on the finished roof, this rear edge is covered by the front portion of the roof tile laid above and is thus shielded against the effects of the weather. In contrast to this, on the finished roof each front edge of the concrete roof tiles is exposed to the effects of the weather, and as a result of the action of moisture which can be further intensified by frost, excessive leaching of calcium salts and the known efflorescence often occurs here. Black spots attributable to the growth of black micro-organisms, such as mold fungi, lichens, algae and the like, which feed on calcium also frequently arise.

SUMMARY OF THE INVENTION

With the foregoing in mind, it is an object of the present invention to provide method and apparatus for making concrete roof tiles which overcomes the disadvantages and drawbacks of the prior methods discussed above and produces a tile of superior quality.

To this end in accordance with the present invention, in the method for producing concrete roof tiles in an extrusion process, a continuous layer of fresh concrete is deposited on pallets supplied in a continuous row to a depositing apparatus and is subsequently compacted by means of a shaping roller and slipper and, if appropriate, profiled, and then the compacted layer of fresh concrete is cut at a cutting station into roof-tile moldings of equal length with a front edge and a rear edge, and the front edge is trimmed.

The apparatus according to the invention for producing concrete roof tiles includes a depositing apparatus which can be supplied with fresh concrete, to form a continuous layer of fresh concrete on a continuous row of displaceable pallets driven by a conveyor. This apparatus also includes a shaping roller and a slipper for compacting and, if appropriate, profiling the layer of fresh concrete running through under them on the pallets. There is also a cutting station, in which a carriage is attached so as to be movable to and fro in the direction of the path of movement of the layer of fresh concrete adapted to the advance of the pallets there being attached to the carriage a cutting knife aligned transversely relative to the path of movement of the layer of fresh concrete and a trimming tool which can be moved periodically into and out of the layer of fresh concrete, in order to form from the continuous compacted layer of fresh concrete individual roof-tile moldings of equal length with a rear edge and a trimmed front edge portion.

With the foregoing in mind, an important object of the present invention is to provide concrete roof tiles, the front edges of which have greater resistance to weathering and higher strength than conventional concrete roof tiles. In particular, the undesirable efflorescence, especially noticeable on colored concrete roof tiles is to be prevented in this region.

A further object of the present invention is to bring the quality of the front end face much closer to the quality of the top side of concrete roof tiles and to achieve this improvement in roof tiles of different shapes.

Starting from a process incorporating the measures indicated above, the manner according to the invention of achieving the objects recited above is characterized in that a rounding or bevel starting from the lower cut edge adjacent to the pallet and extending up to the top side of the roof-tile moldings is produced on the front edge as a result of a compacting of material.

Preferably, this compacting of material will extend over the entire front and face of the roof-tile moldings and close or smooth the pores and/or irregularities formed during cutting. In practice, this compacting of material can extend over an edge zone at least 2 to 8 mm wide adjoining the end face on the front edge of the roof-tile moldings.

According to a further feature of the invention, this rounding or bevel produced as a result of a compacting of material can be obtained on the front edge by means of a simple and easily practicable conversion of the above-mentioned apparatus for producing concrete roof tiles in an extrusion process, adaptable directly to different shapes of roof tiles. In this respect, starting from an apparatus having the features mentioned above, the manner according to the invention of achieving the object is characterized in that the trimming tool is an indentation tool which matches the profile of the layer of fresh concrete and which, during its movement penetrating into the layer of fresh concrete, compacts the front edge portion produced in the preceding work cycle over the entire cross-section of the latter.

Preferably, this indentation tool has a lower edge directed onto the layer of fresh concrete and, adjacent to the front edge portion, a generated surface which is curved or inclined in such a way that the vertical distance between this generated surface and a plane aligned perpendicularly relative to the path of movement of the layer of fresh concrete and intersecting this lower edge increases continuously with an increasing distance from the lower edge.

In this case the generated surface of the indentation tool can be plain or curved, for example, according to the curvature of a segment of a parabola.

A further feature of the invention relates to the roof-tile moldings produced from fresh concrete by the new process and to the concrete roof tiles obtainable after a conventional drying and curing operation. These concrete roof tiles have on the front edge a rounding or bevel which is produced as a result of a compacting of material and which extends from the lower edge of the bottom foot rib to the top side of the roof tile and merges into this top side. Because the rounding or bevel has not been produced as a result of a removal of material, but as a result of a compacting of material by compression, the front edge is a compacted, smooth and practically pore-free end face which has virtually the same quality as the compacted top side of the concrete roof tiles. The end face is closed as a result of the compacting, thus counteracting efflorescence. Furthermore, waterproofing and frost resistance are considerably improved as a result. Finally, the compacting of material on the front edge increases the breaking strength of concrete roof tiles in this region.

According to the preferred method, the compacting of the material of the front edge is carried out in steps. Preferably, a front edge portion is further precompacted already during the cutting of the compacted layer of fresh concrete. During this precompacting, fresh concrete is pressed down onto the pallet from the top side of the layer of fresh concrete. This precompacting can be produced, for example, by means of a step-shaped indentation in the front edge portion. Good results have been achieved with a step-shaped indentation which compresses the edge portion to approximately half its cross-sectional height.

This precompacting operation, together with the cutting of the layer of fresh concrete, can also be carried out, without any substantial changes, at the cutting station. Preferably, a pre-compacting tool is simply attached to the side of the cutting knife facing away from the indentation tool. This precompacting tool is moved together with the knife, and, during the cutting of the layer of fresh concrete, partially penetrates from the top side into the layer of fresh concrete adjacent to the knife and compacts this even further. The plastic fresh concrete is prevented from escaping on the fresh cut surface because of the presence of the knife.

Preferably, this precompacting tool is a strip which matches the profile of the compacted layer of fresh concrete and is set back from the cutting edge of the cutting knife and which, during the cutting of the layer of fresh concrete, compresses in the form of a step the adjacent front edge portion. This strip can be made in one piece with the cutting knife.

The step or the like produced during precompacting is smoothed in the next work cycle under the deforming effect of the generated surface of the indentation tool, together with a further compacting of material, and is deformed into the desired rounding or bevel. Appropriately, the extent and form of precompacting are matched to the desired rounding or bevel of the front edge portion; for example, to produce a bevel, several steps in the form of a flight of stairs are produced during precompacting, as explained below in detail with reference to FIG. 7.

It has been found, within the framework of the invention, that, precisely because of the extremely high forward linear speed of the cutting knife and indentation tool, the compacting of the material of the front edge portion in two steps ensures that front end face has an even higher quality. Compacting is even greater and the pore sealing of the end face is even better, so that practically the same quality of the top side of the concrete roof tiles which is compacted by means of a shaping roller and slipper can be achieved. Because of the high quality which can be obtained on the front end face in two-stage compacting, this two-stage compacting of material is especially preferred within the framework of the present invention.

Even when the compacting of material provided according to the invention and extending over the entire cross-section, to produce a rounding or bevel on the front edge of a concrete roof tile, is carried out in two separate steps, the conversion of the known cutting station needed for this purpose is simple and requires only a comparatively small outlay. The known trimming knife is replaced by an indentation tool, the generated surface of which is matched both to the profile of the concrete roof tile and to the desired rounding or bevel of the front edge. The indentation tool is fastened via a tool-holder to a piston/cylinder arrangement which itself is attached to the carriage movable to and fro. Slots in the tool-holder allow the indentation tool to be adjusted vertically in a simple way in relation to the layer of fresh concrete resting on the pallets. When the type of concrete roof tile to be produced is changed, the indentation tool can simply be released from the tool-holder and replaced by another suitable indentation tool. Although the aim is to move the indentation tool vertically in relation to the layer of fresh concrete, the known inclined position can also be retained, provided that the angle between the path of movement of the indentation tool and a perpendicular to the path of movement of the layer of fresh concrete does not exceed approximately 10° to 12°.

As already stated above, the precompacting tool required for the two-stage compacting can consist of a strip fastened to the cutting knife which is necessary in any case. Alternatively, it is possible to use a combined one-piece tool, on which is formed a strip arranged set back from the cutting edge of the cutting knife. The use of such a combined cutting and precompacting tool is preferred, since the conventional tool-holder can still be used and there is no need for additional fastening devices. Again, by means of slots in the tool the height of the cutting knife and/or the precompacting tool can easily be adjusted relative to the layer of fresh concrete.

Advantageously, both the indentation tool and the precompacting tool can consist of a material which does not adhere or adheres as little as possible to the layer of fresh concrete; for example, chromium-plated steel or brass can be provided for this purpose. Alternatively, the indentation tool in particular can consist of wear-resistant plastic, from which a tool having the required generated surface can be made more simply and more inexpensively. The service life which in each particular case is shorter than that of a metal tool is counterbalanced by the lower production cost.

BRIEF DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENTS

Figure 1:
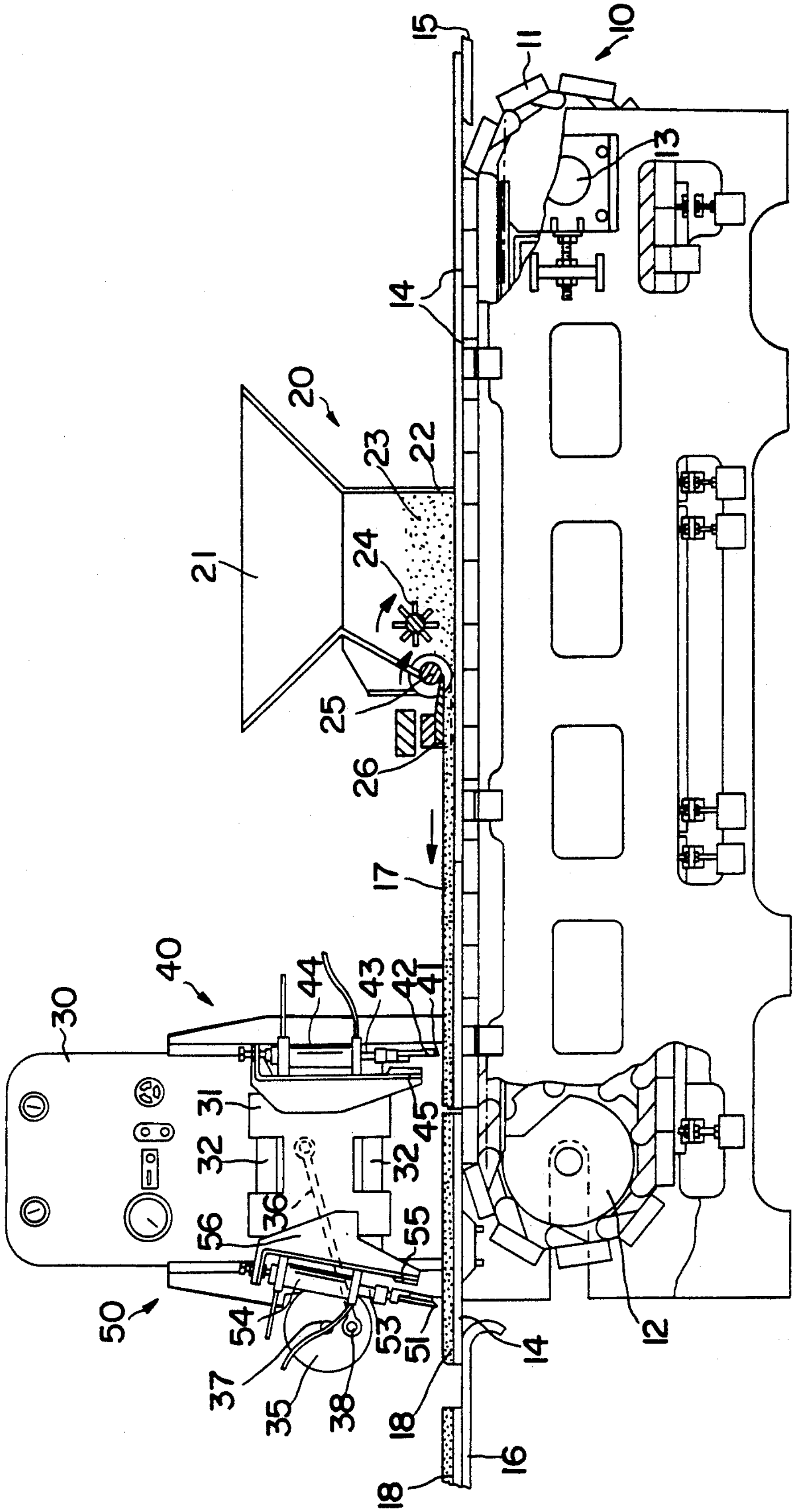
FIG. 1 shows a side view of part of the apparatus according to the invention for producing concrete roof tiles in an extrusion process.

Referring now to the drawings and particularly to FIG. 1 thereof, there is illustrated apparatus in accordance with the present invention for producing concrete roof tiles in an extrusion process. The apparatus includes a concrete feed or depositing apparatus 20 and a cutting station 30. A conveyor 10, having an endless drive chain 11 which passes around a drive sprocket wheel 12 and a guide sprocket wheel 13, transports pallets 14 arranged in succession in a continuous row rest on guides through the depositing apparatus 20 and the cutting station 30 by engagement means (not shown) fastened to the drive chain. A feed conveyor 15 supplies empty pallets 14, and a takeaway or discharge conveyor 16 transports further the roof-tile moldings 18 located on the pallets 14.

A fresh-concrete container 21 of the depositing apparatus 20 is supplied with fresh concrete 23 from a mixer (not shown). The pallets 14 pass under the outlet 22 of the fresh-concrete container 21, and a spiked roller covers the pallets 14 uniformly with fresh concrete. A shaping roller 25 matching the profile of the concrete roof tiles to be produced and a following slipper 26 profile and compact the deposited layer of fresh concrete. After leaving the depositing apparatus 20, a compacted continuous layer of fresh concrete 17 rests on the pallets 14.

The layer of fresh concrete 17 located on the pallets 14 then passes into the cutting station 30, where the layer of fresh concrete, continuous up to then, is cut into individual roof-tile moldings 18, and a rounding or bevel provided according to the invention is produced on their front edge as a result of a compacting of material.

The cutting station 30 comprises the actual cutting device 40 with the cutting knife 41 and the trimming device 50 with the indentation tool 51 provided according to the invention. In the exemplary embodiment illustrated in the drawings, the cutting knife 41 is equipped in addition with a precompacting tool 42 provided according to the invention.

In a way known per se, the cutting station 30 has a carriage 31 moving to and fro and running on two cross head slides 32 which extend above the path of movement of the pallets 14 and the compacted layer of fresh concrete 17 in its longitudinal direction. The cutting device 40 is arranged at one end of the carriage 31, and the trimming device 50 is arranged at the other end. The cutting knife 41 together with the precompacting tool 42 and the indentation tool 51 are each fastened to a piston 43 or 53 respectively of a compressed-air cylinder 44 or 54, respectively, by means of which they can be moved into and out of the layer of fresh concrete 17. During their movement, the cutting knife 41 together with the precompacting tool 42 and the indentation tool 51 are guided parallel to guide surfaces 45 or 55 respectively, the cutting knife 41 together with the precompacting tool being guided perpendicularly relative to the layer of fresh concrete 17, and the indentation tool being guided inclined rearwardly relative to the roof-tile molding 18. The trimming device 50 is mounted on a sub-frame 56 which can be adjusted in the longitudinal direction of the path of movement of the roof-tile moldings 18 relative to the to and fro movable carriage 31, so that the distance between the cutting knife 41 together with the precompacting tool 42 and the indentation tool 51 is variable, with a result that adaptations to the molding length which may be necessary can be carried out quickly.

To move the carriage 31 to and fro on the slides 32, a rotating crank 35 and a connecting rod 36 which is pivotably connected to the carriage 31 are provided. In the exemplary embodiment illustrated, the crank 35 is a disc which is located on a shaft 37 and which carries near its periphery a crank pin 38 for fastening one end of the connecting rod 36. The shaft 37 is rotated at a speed proportional to the advancing speed of the conveyor 10, in such a way that for each pallet 14 passing the cutting station 30 the crank 35 makes one revolution and the carriage 31 reciprocates once. The speed relationship required between the conveyor 10 and the crank 35 is achieved by a gear train (not shown).

As already mentioned, the cutting knife 41 together with the precompacting tool 42 and the indentation tool 51 are actuated by means of compressed air and can be controlled by a servo-system, as described in detail in Matthews U.S. Pat. No. 3,776,075.

Figure 2:
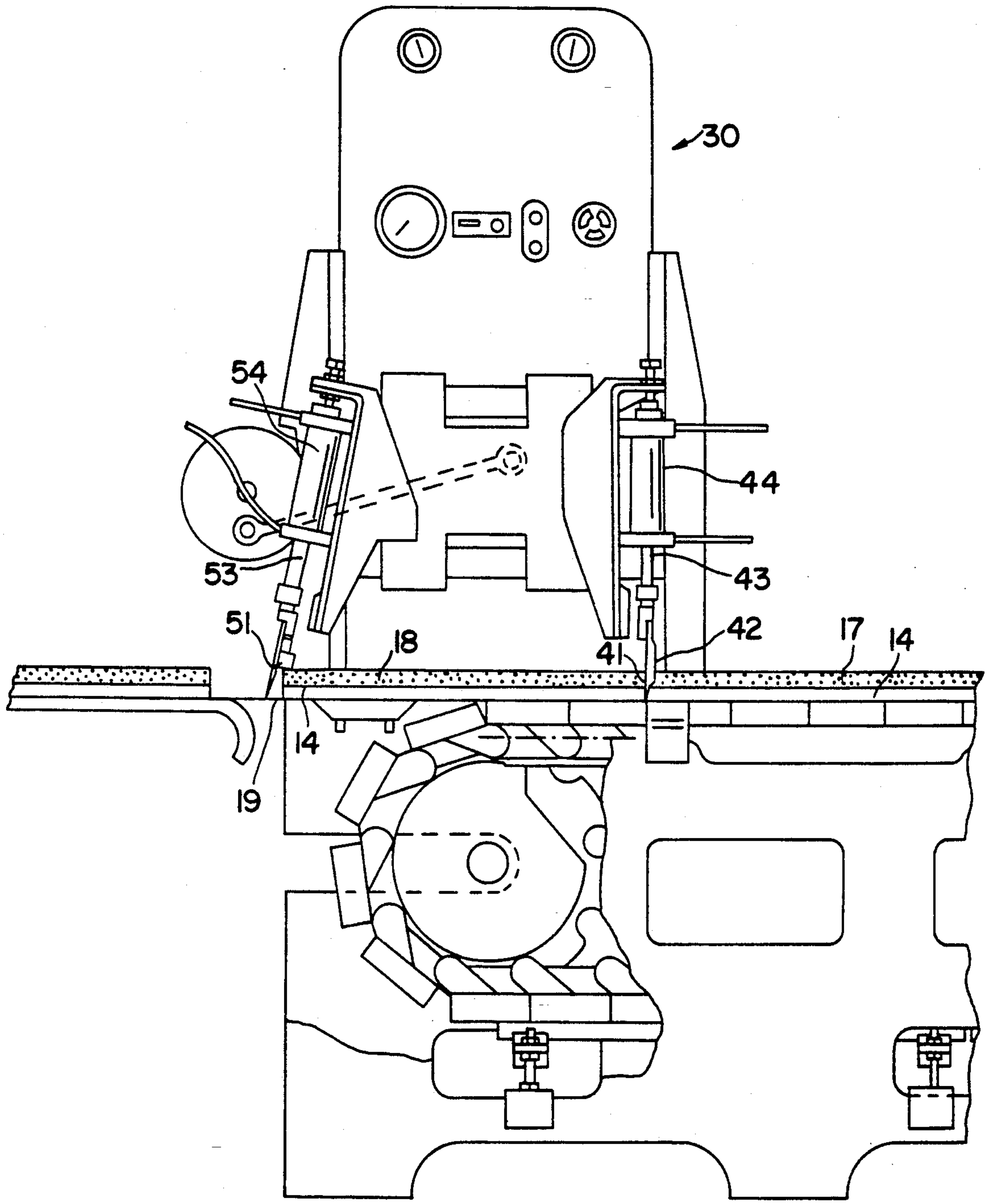
FIG. 2 shows, on a larger scale, a side view of the cutting station of the apparatus according to FIG. 1, the cutting knife together with the precompacting tool and the indentation tool shown in a positioned layer of fresh concrete.

FIG. 2 shows, on a larger scale, the cutting station 30 according to FIG. 1, the cutting knife 41 together with the precompacting tool 42 and the indentation tool 51 being in the layer of fresh concrete 17 conveyed on the pallets 14. The cutting knife 41 moved downwards by the piston/cylinder arrangement 43/44 severs the compacted layer of fresh concrete 17. At the same time, the precompacting tool 42 located on the rear side of the cutting knife 41 presses a step into the layer of fresh concrete 17, fresh concrete being pressed towards the pallet 14 from the top side. The piece cut off by the cutting knife 41 forms the roof-tile molding 18.

The indentation tool 51 moved downwards by the piston/cylinder arrangement 53/54 executes a further compacting of material on the front edge portion 19 of the roof-tile molding 18 provided in the preceding work cycle with a precompacted step, and produces the desired rounding or bevel there.

Figure 3:
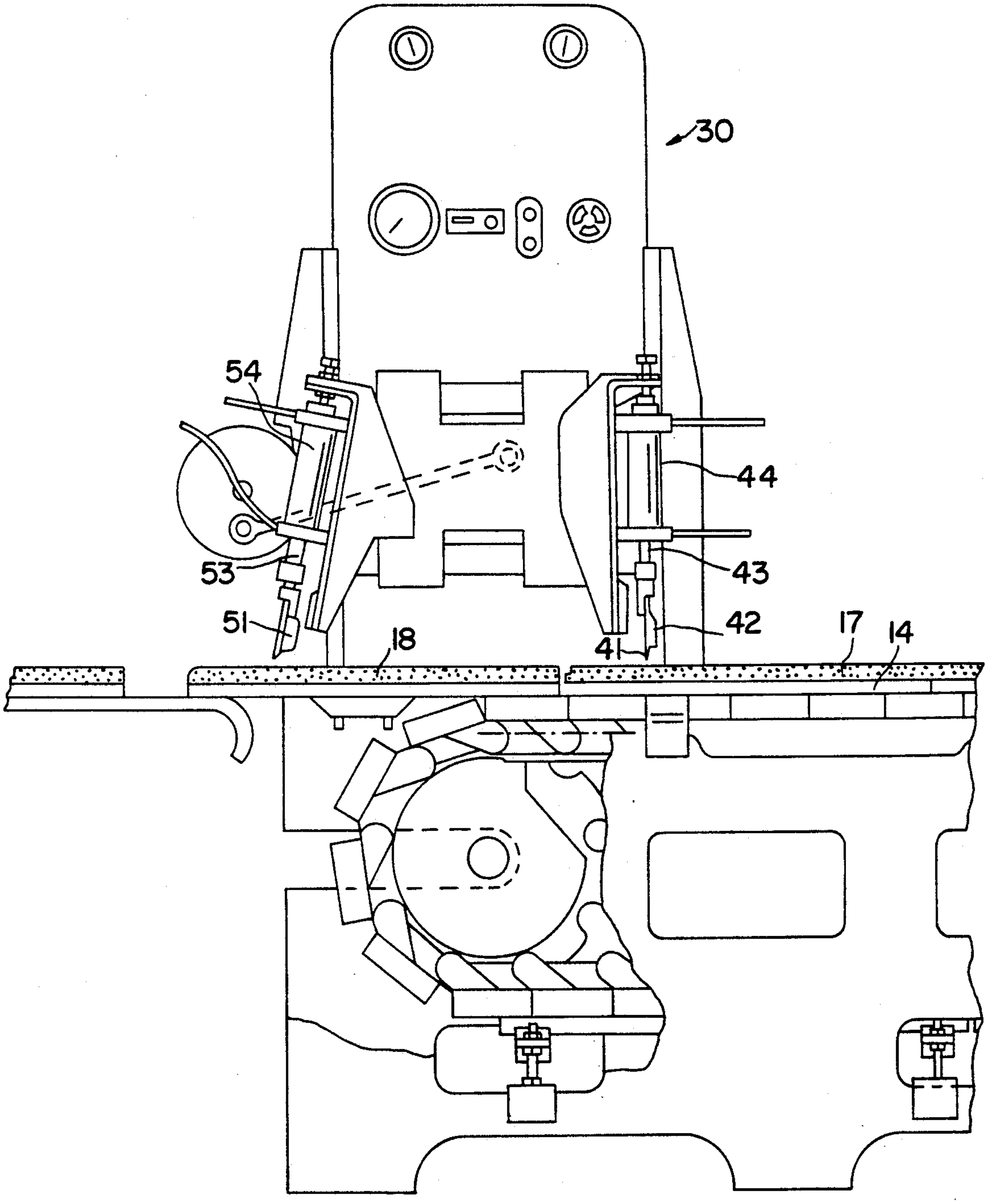
FIG. 3 shows a side view of the cutting station according to FIG. 2, but here the cutting knife together with the precompacting tool and the indentation tool are located above the layer of fresh concrete, and an already finished roof-tile molding is further advanced in its path of movement.

FIG. 3 shows the cutting station 30 essentially according to FIG. 2, but at a later juncture in the course of a work cycle. The cutting knife 41 together with the precompacting tool 42 has been lifted by the piston/cylinder arrangement 43/44 and thus released from the layer of fresh concrete 17. In the same way, the indentation tool 51 has been lifted by the piston/cylinder arrangement 53/54 and released from the roof-tile molding 18. The driven pallets 14 have already advanced the continuous layer of fresh concrete 17 and the roof-tile molding 18 separated from it a specific distance in their path of movement. At the moment when the indentation tool 51 is next lowered, the step made at the end of the layer of fresh concrete 17 by the precompacting tool 42 will have entered the range of action of the indentation tool 51 and will be deformed by the latter into the desired bevel or rounding as a result of a further compacting of material.

Figure 4:
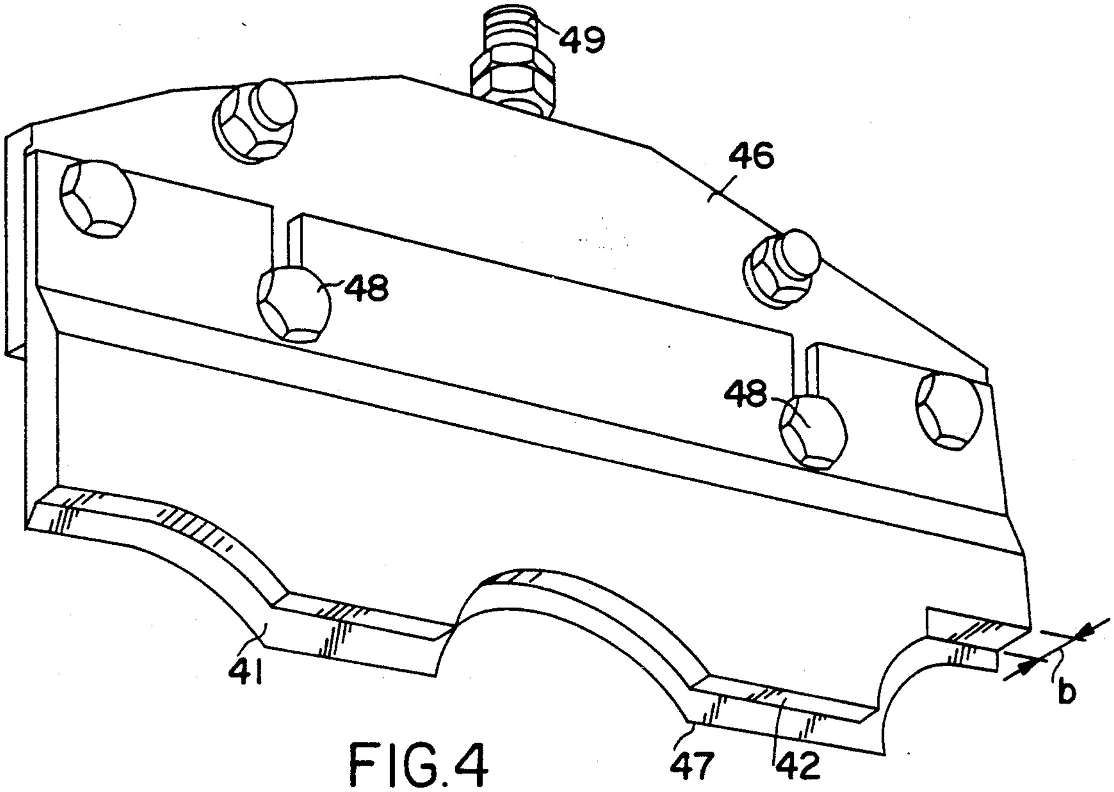
FIG. 4 shows, in a perspective representation, the cutting knife together with the precompacting tool from FIGS. 1 to 3.
Figure 9:
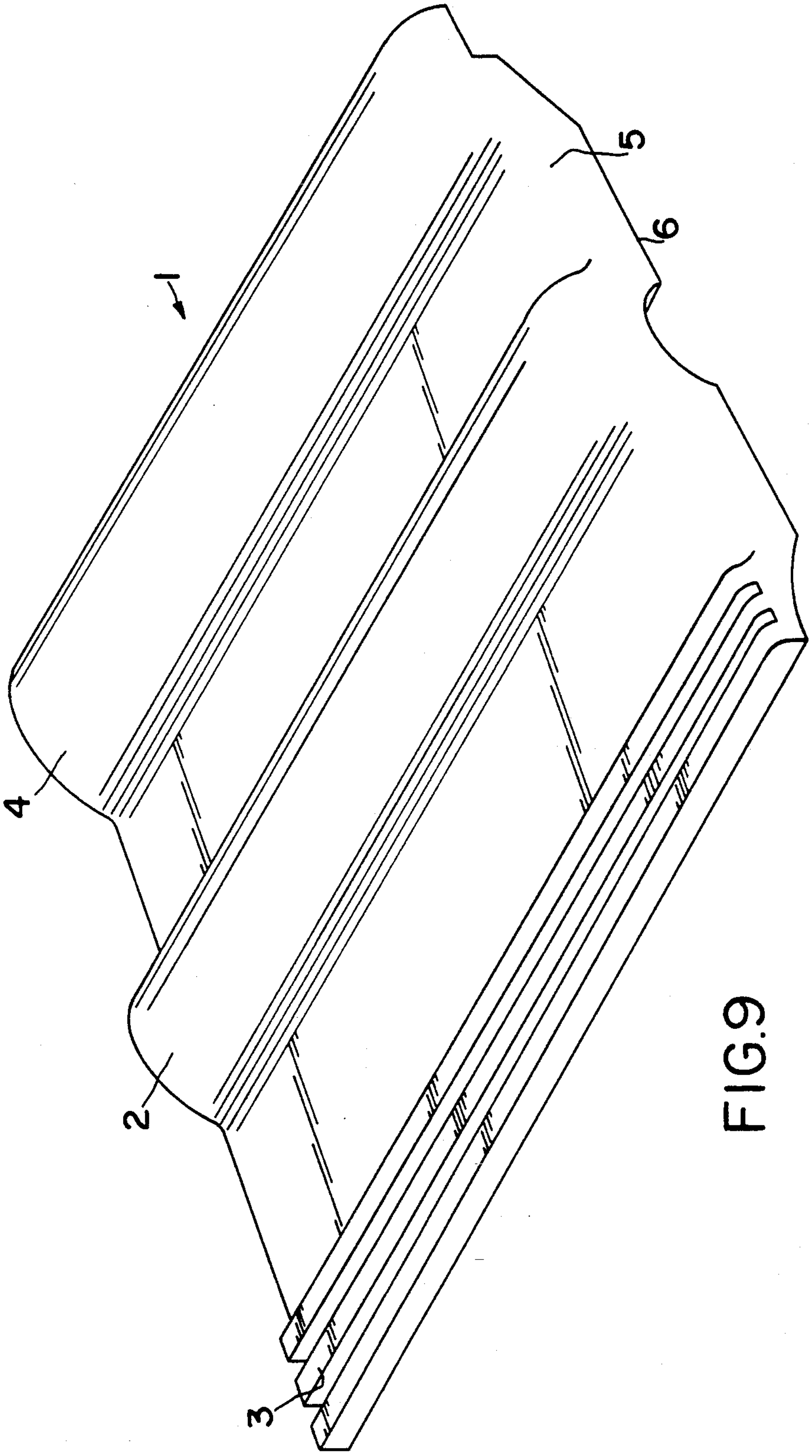
FIG. 9 is a perspective view of a finished concrete roof tile, the front edge of which has a rounding produced as a result of the compacting of material provided according to the invention.

FIG. 4 shows, in a perspective representation, the cutting knife 41 together with the precompacting tool 42 on a tool-holder 46. Here, the profile of the cutting knife 41 and of the precompacting tool 42 is matched to the profile of a concrete roof tile, as shown in FIG. 9. Following this profile, the precompacting tool 42 forms a step which is set back a specific distance from the cutting edge 47 of the cutting knife 41. The height of the step can, for example, correspond to half the layer thickness of the layer of fresh concrete. The width b of the precompacting tool 42 can be several millimeters, for example 2 to 8 mm. Good results have been obtained with a precompacting tool 42 having a width b of 5 mm. The combined cutting and precompacting tool is fastened to the tool-holder 46 by means of screw bolts 48. As illustrated, slots can be provided on the tool for this purpose, to allow the height of the tool to be adjusted in a simple way. The tool-holder 46 can be fastened to the piston 43 of the compressed-air cylinder 44 via a stud bolt 49.

Figure 5:
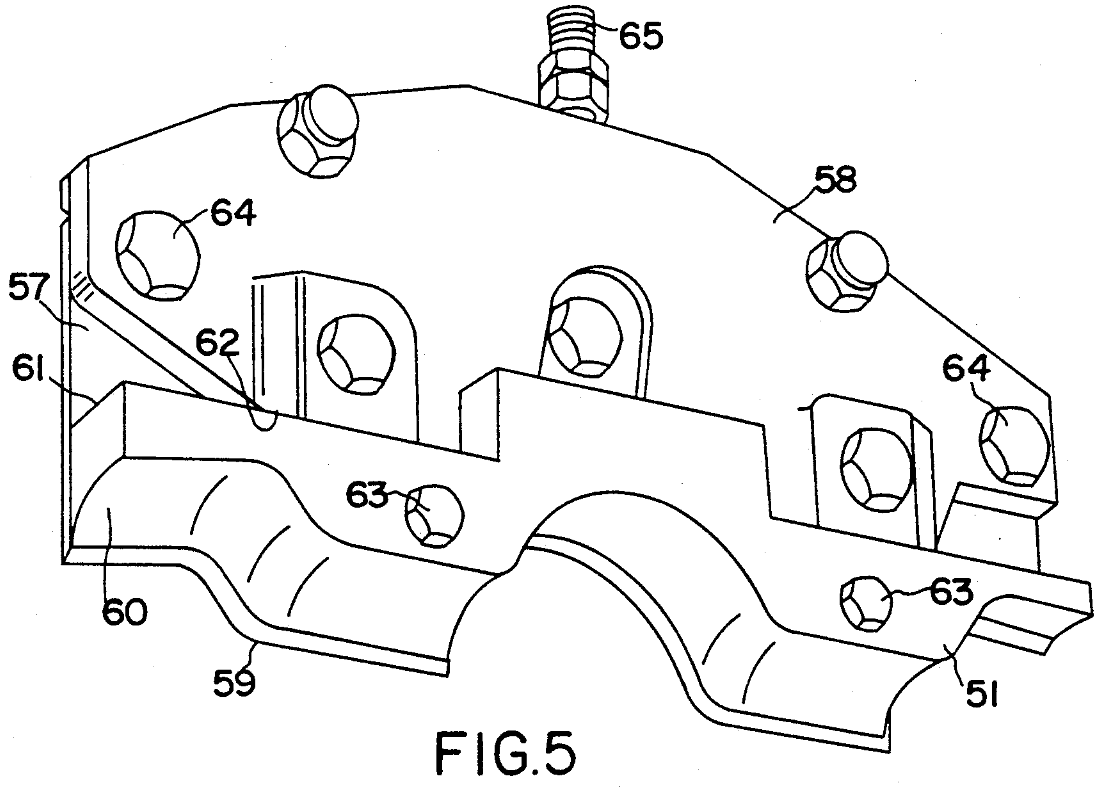
FIG. 5 is a perspective view of the indentation tool of FIGS. 1 to 3.

FIG. 5 shows, in a perspective representation, the indentation tool 51 which is fastened to a tool-holder 58 via a retaining plate 57. The indentation tool 51 has a generated surface 60 of specific shape. The profile of this generated surface and the profile of the lower edge 59 of the retaining plate 57 are likewise matched to the profile of the concrete roof tile 1 according to FIG. 9. The indentation tool 51 can consist of wear-resistant plastic, in order to save weight and keep as low as possible the moments of inertia arising during the up-and-down movement of the tool. To guarantee a stable support nevertheless, the indentation tool 51 rests by means of its top side 61 against the underside 62 of the tool-holder 58, as can be seen more clearly in FIG. 6. The indentation tool 51 is fastened via screwbolts 63 to the retaining plate 57 which itself is fastened to the tool-holder 58 via further screwbolts 64. The tool-holder 58 is connected to the piston 53 of the compressed-air cylinder 54 via a stud bolt 65. If required, the lower edge 59 of the retaining plate 57 can be formed like cutting edge to remove excess fresh concrete.

Figure 6:
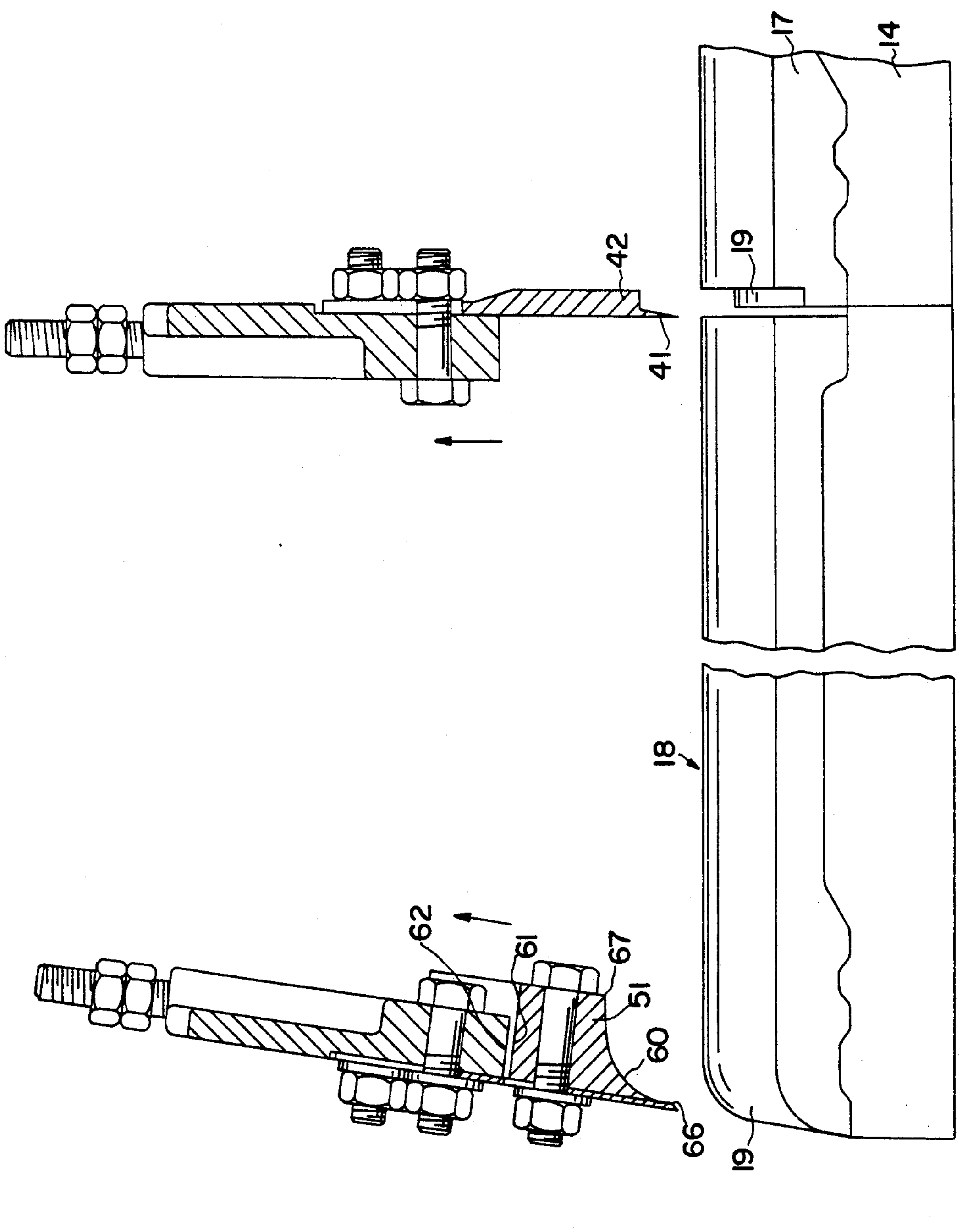
FIG. 6 shows, on a larger scale, a longitudinal section through the cutting knife together with the precompacting tool, the indentation tool and the layer of fresh concrete according to FIG. 2, immediately after the corresponding cutting and shaping operation.

FIG. 6 shows the tools according to FIGS. 4 and 5 in a sectional representation above a profiled roof-tile molding 18. In the embodiment shown here, the indentation tool 51 has a curved generated surface 60. The curvature of this generated surface 60 can have a constant radius of curvature, so that the rounding on the front edge 19 follows a circular arc. Alternatively, the generated surface 60 can have a curvature with a changing radius of curvature; for example, the curvature of the generated surface 60 can follow a segment of a parabola, the vertex of the corresponding parabola preferably being located at the upper end of the generated surface.

An imaginary chord connecting one end point 66 to the other end point 67 of the curve of the generated surface 60 can form an angle of approximately 20° to 50° with a straight line running through the end point 66 parallel to the front edge bearing plane of the molding. If the curvature of the generated surface follows a segment of a parabola and this angle is approximately 35°, a rounding is obtained on the front edge 19 as a result of a compacting of material according to the invention giving the roof tile a streamlined appearance.

A roof surface covered with concrete roof tiles of this type has a particularly harmonious effect. Such a shaping is, therefore, also preferred within the framework of the invention.

In the combined cutting and precompacting tool also illustrated in FIG. 6, the cutting knife 41 and the precompacting tool 42 are made in one piece. As is evident, this tool carries out a step-shaped precompacting with a single step on the front edge portion 19, by pressing fresh concrete towards the pallet 14 from the top side, when the cutting knife 41 severs the layer of fresh concrete 17.

Figure 7:
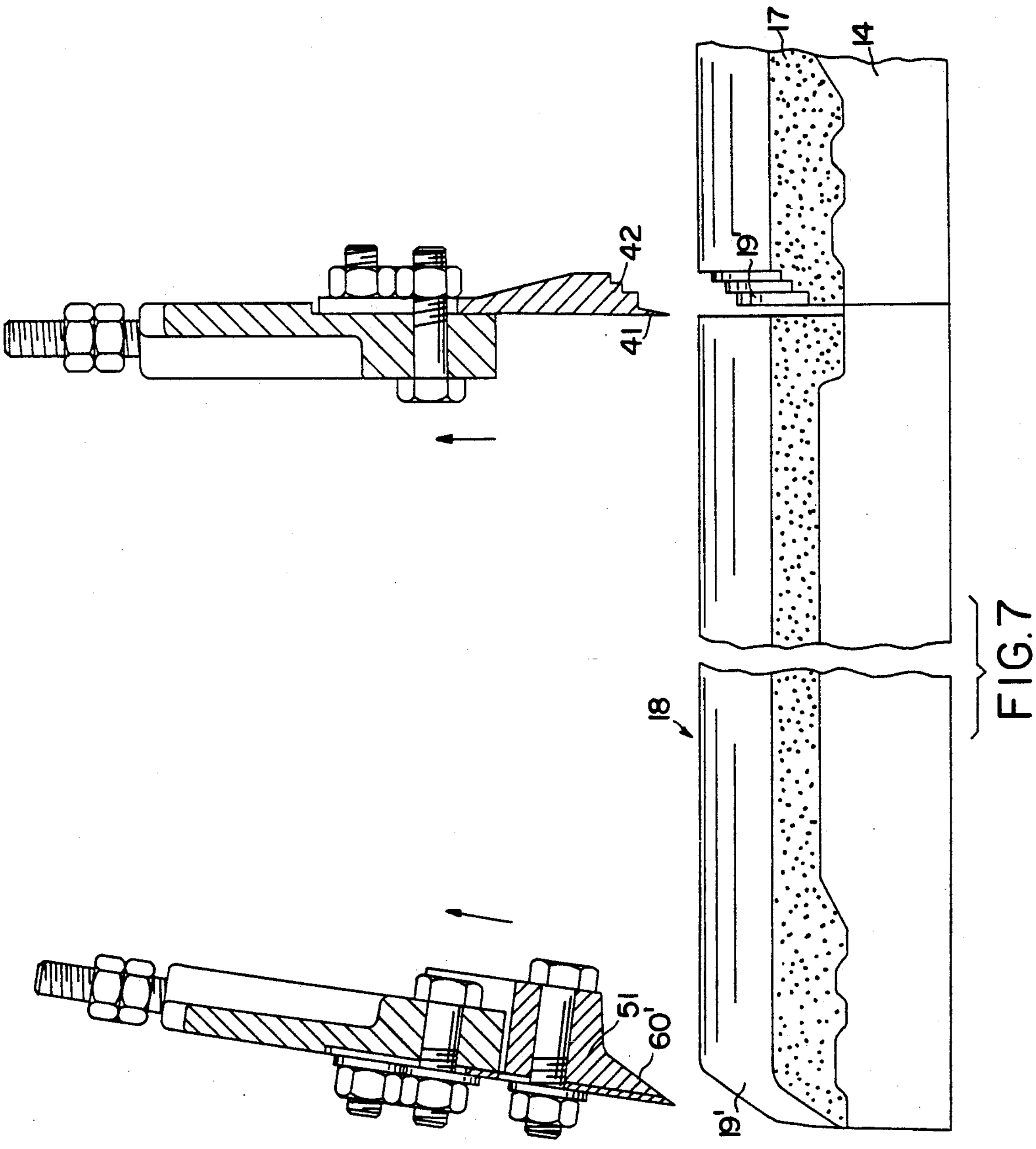
FIG. 7 shows, in a representation corresponding to that of FIG. 6, an alternative design of a cutting knife together with a precompacting tool and of an indentation tool.

FIG. 7 shows an alternative design of the tools according to FIG. 6. As illustrated, the precompacting tool 42 has a multi-step design. When the cutting knife 41 severs the ribbon of fresh concrete 17, this precompacting tool produces a precompacting in the form of a flight of stairs, with several steps, on the front edge portion 19'. In this case too, the precompacting tool 42 presses fresh concrete towards the pallet 14 from the top side. However, the steps of the tool should not be chosen too small, because otherwise it is possible for fresh concrete to remain adhering to the precompacting tool 42.

Such a multi-step precompacting tool 42 is especially practical when, as also shown in FIG. 7, the indentation tool 51 has a plane generated surface 60′, to produce a bevel on the front edge of the roof-tile moldings 18. In this case, during the compacting of the front edge portion 19′ the indentation tool 51 has to push away less fresh concrete, because the contour of the precompacting produced by means of the multi-step precompacting tool 42 already substantially matches the inclination of the plane generated surface 60′ and thus the desired bevel of the front edge.

Figure 8A:
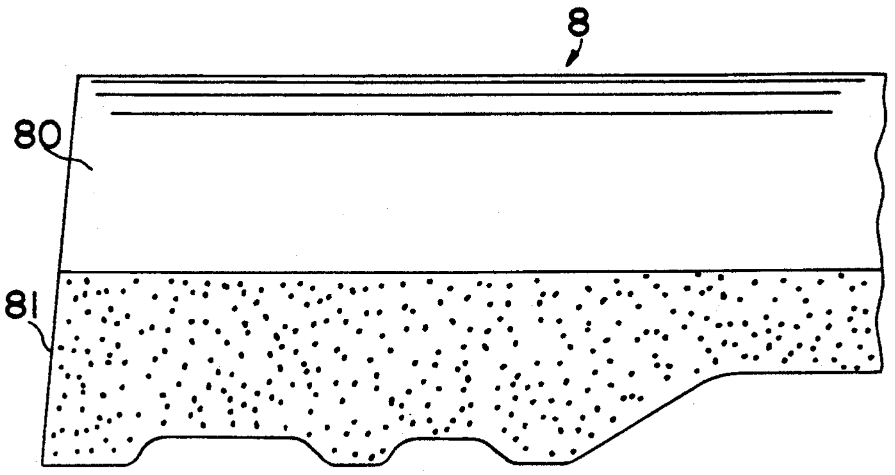
FIGS. 8*a*, 8*b* and 8*c* show, each in a longitudinal section, the front edge portion of a conventionally trimmed roof-tile molding (FIG. 8*a*), the corresponding front edge portion after the precompacting provided according to the invention (FIG. 8*b*), and the corresponding front edge portion after a rounding has been produced as a result of the compacting of material provided according to the invention (FIG. 8*c*)
Figure 8B:
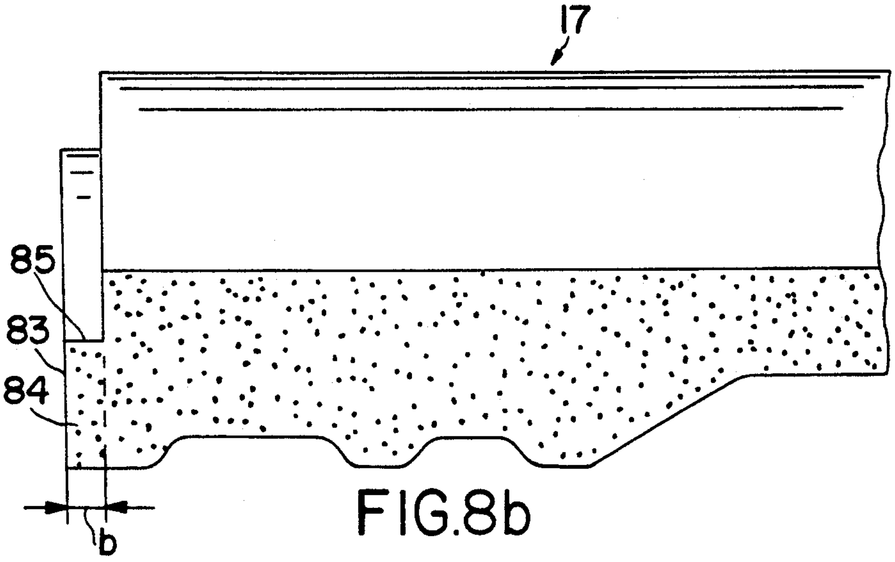
Figure 8C:
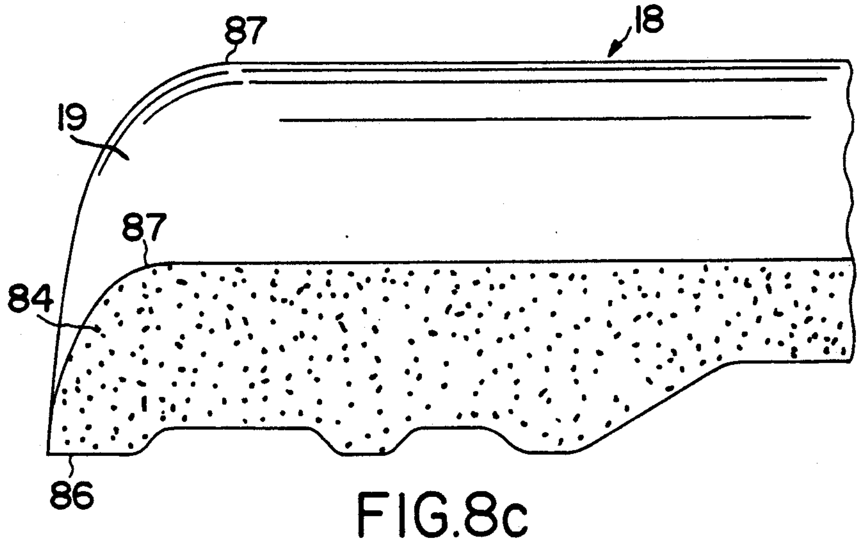

FIGS. 8*a*, 8*b* and 8*c* serve to compare the process according to the invention with the conventional trimming of concrete roof tiles.

FIG. 8*a* shows part of a conventional roof-tile molding 8, the front edge 80 of which is formed by an inclined plane cut surface which can be obtained, for example, by means of the obliquely guided trimming knife according to Matthews U.S. Pat. No. 3,776,075. A rough and porous cut surface 81 is produced because of the high cutting speed of the trimming knife.

FIG. 8*b* shows the edge portion, obtained after cutting and after the precompacting according to the invention, of the continuous layer of fresh concrete 17 according to FIG. 6. Adjacent to the cut surface 83, the precompacting tool has precompacted an edge region 84, the width b of which amounts, for example, to approximately 5 mm. For this purpose, the precompacting tool has displaced fresh concrete downwards from the top side to form a step 85. At the same time, precompacting is carried out over the entire width of the layer of fresh concrete 17.

FIG. 8*c* shows the ready-compacted front edge of the roof-tile molding 18 according to the invention, as shown in FIG. 6. In comparison with the step-shaped precompacting according to FIG. 8*b*, produced by means of the precompacting tool, the indentation tool has produced a smooth uniform rounding on the front edge portion 19 with a further compacting of material. This rounding extends over the entire width of the roof-tile molding. The compacted region 84 adjoining the end face has a width of approximately 5 mm and extends from the lower edge 86 up to the top side 87 over the entire cross-sectional profile of the roof-tile molding 18. As a result of the compacting and because of the smooth surface, the edge region 84 has a substantially higher quality than the front edge 80 of a conventional concrete roof tile according to FIG. 8*a*.

FIG. 9 shows a concrete roof tile 1 obtained from the roof-tile molding 18 after a conventional drying and curing operation. As illustrated, this is a profiled concrete roof tile with a central roll 2, a raised water lock 3 on one longitudinal edge of the roof tile and an edge bulge 4 with a bottom cover lock on the other longitudinal edge of the roof tile. The front edge region 5 is rounded uniformly. This rounding has been produced by means of a compacting of material, and a resulting compacted zone at least several millimeters wide extends from the lower edge 6 of the concrete roof tile up to the top side over the entire cross-section of the latter.

While particular embodiments of the present invention have been shown and described herein, it is not intended to limit the invention and changes and modifications may be made therein within the scope of the following claims.

What is claimed is:

1. A method for making concrete roof tiles consisting of the steps of:

(a) forming a continuous elongated ribbon or layer of concrete;

(b) cutting the continuous layer into a row of spaced end to end adjacent ribbon sections having a front edge and rear edge wherein the front edge of each adjacent ribbon section is precompacted during the cutting step and then;

(c) compacting and profiling the precompacted front edge of each adjacent ribbon section to form the concrete roof tiles wherein steps (b) and (c) are performed simultaneously on two adjacent ribbon sections such that a previously precompacted front edge of one adjacent ribbon section is compacted and profiled while the front edge of the adjacent ribbon section is precompacted.

2. A method as claimed in claim 1 wherein the compacting and profiling the precompacted front edge is carried out over an entire front edge to close and smooth pores and irregularities formed during the cutting step.

3. A method as claimed in claim 1 wherein the compacting and profiling is carried out over a zone in the front edge which is two to eight mm wide.

4. A method as claimed in claim 1 wherein a step shaped indentation is formed in the front edge of each adjacent ribbon section during the cutting step.

5. A method as claimed in claim 1 wherein a rounding of the front edge is produced during the compacting and profiling step, having a continuously changing radius of curvature.

6. A method as claimed in claim 5 wherein the curvature corresponds to a segment of a parabola.

* * * * *